Oct. 23, 1951  C. S. MORRISON  2,572,180
FEEDING MECHANISM FOR BALERS AND LIKE MACHINES
Filed June 15, 1950  3 Sheets-Sheet 1
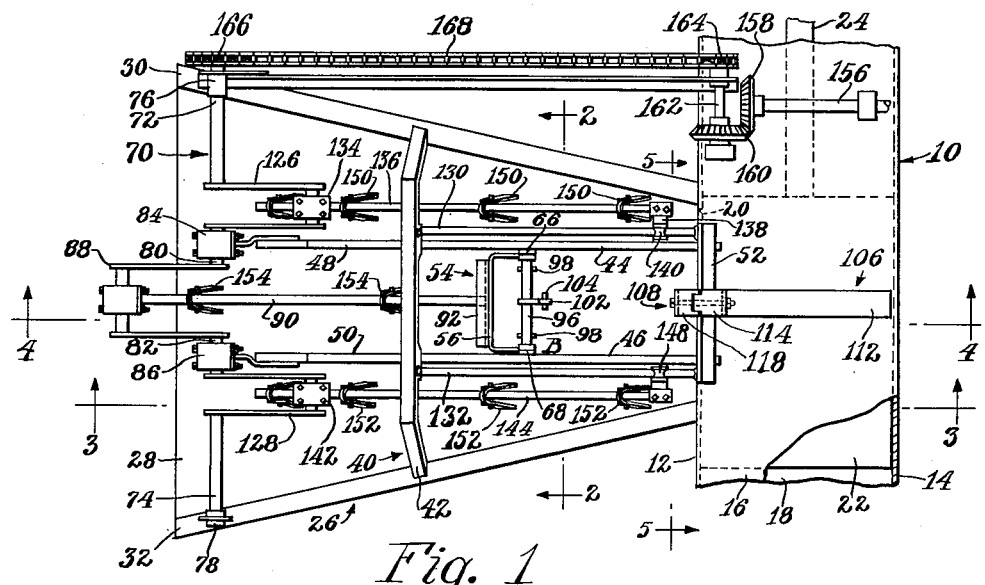
Fig. 1
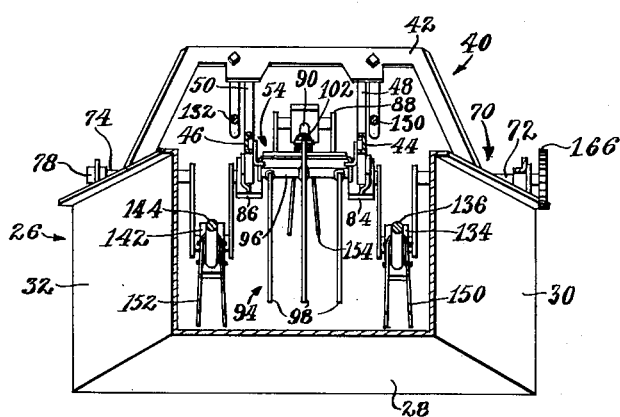
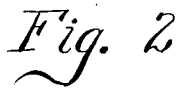
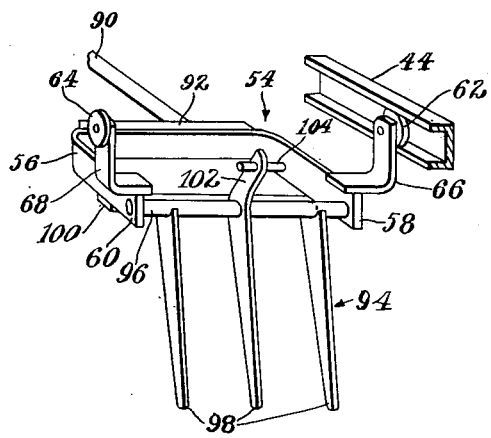
INVENTOR.
C. S. Morrison
BY
Attorneys Oct. 23, 1951  C. S. MORRISON  2,572,180
FEEDING MECHANISM FOR BALERS AND LIKE MACHINES
Filed June 15, 1950  3 Sheets-Sheet 2
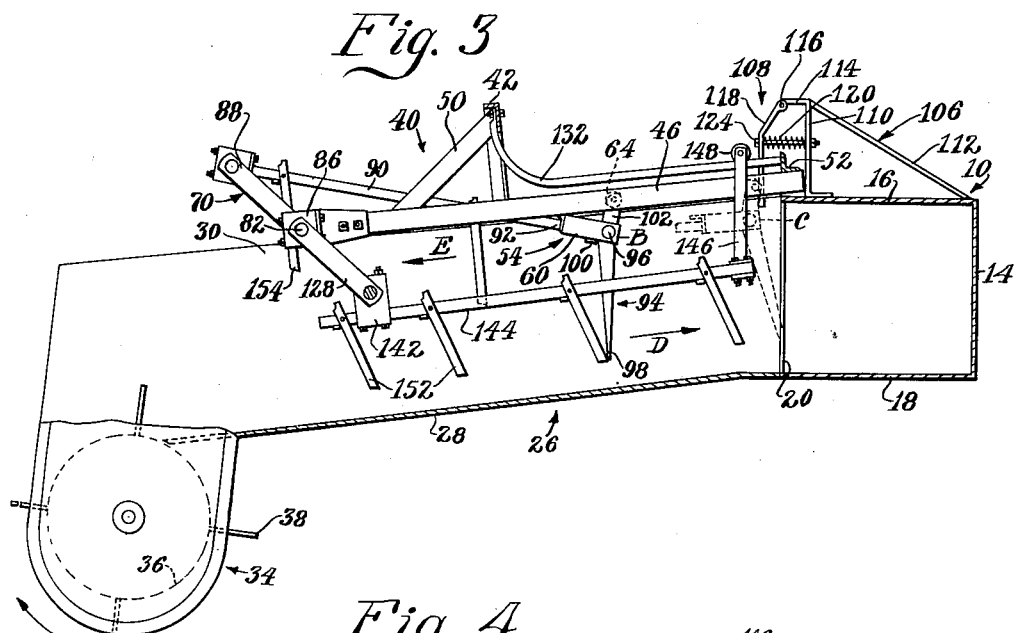
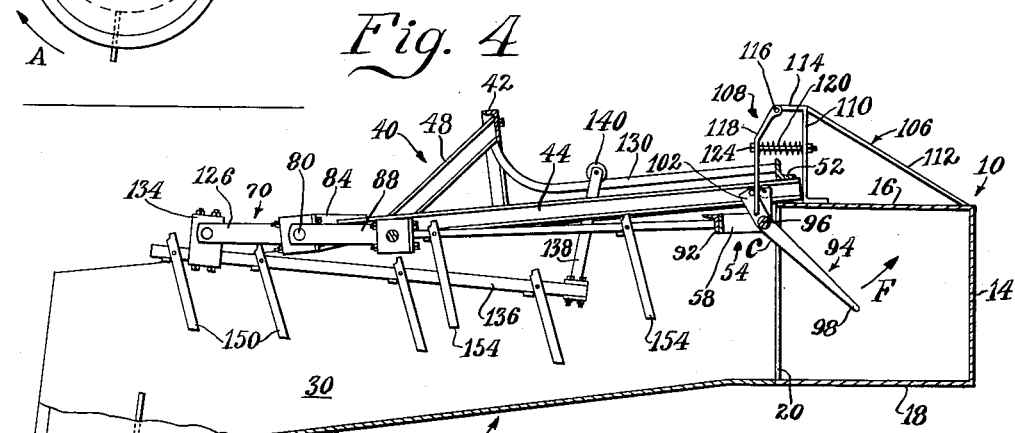
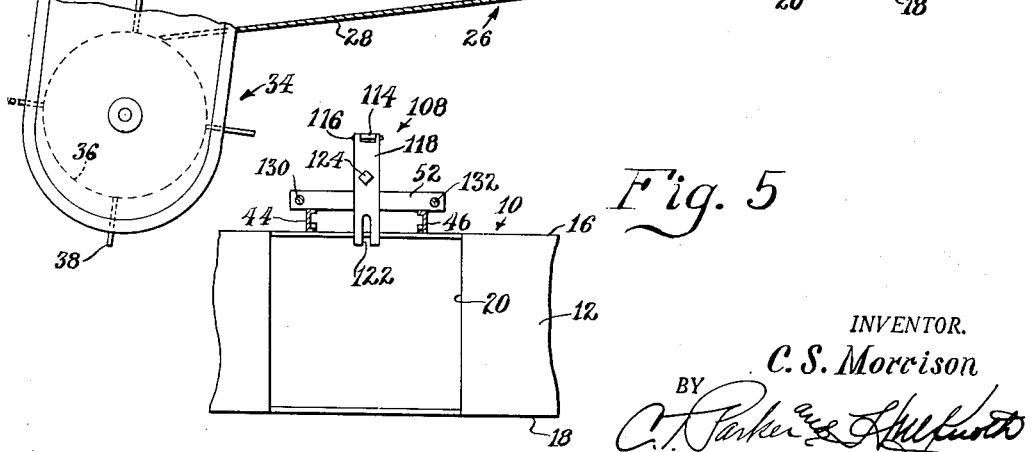
INVENTOR.
C. S. Morrison
BY
Attorneys Oct. 23, 1951        C. S. MORRISON        2,572,180
FEEDING MECHANISM FOR BALERS AND LIKE MACHINES
Filed June 15, 1950        3 Sheets-Sheet 3
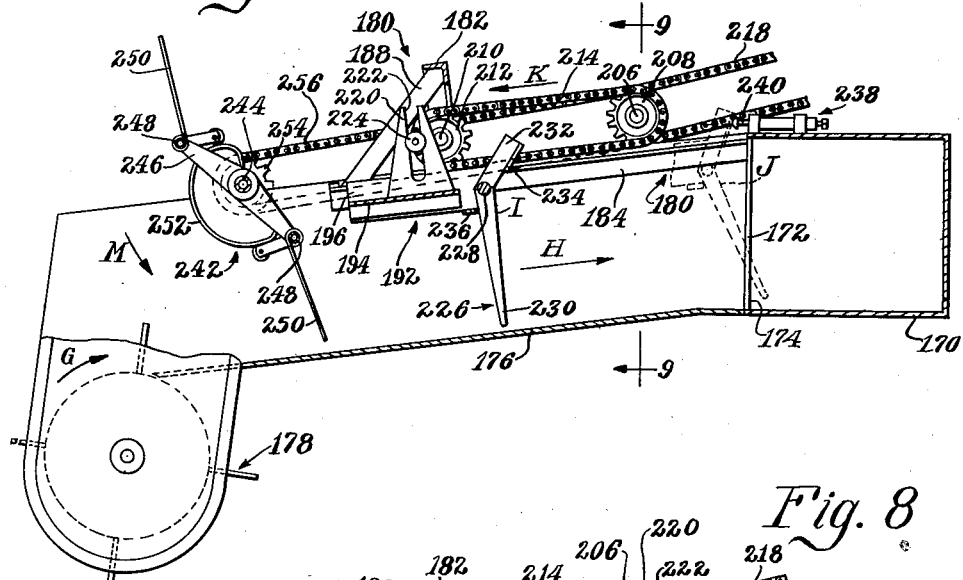
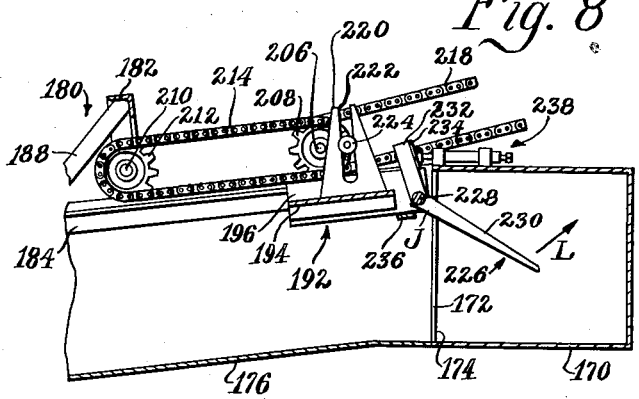
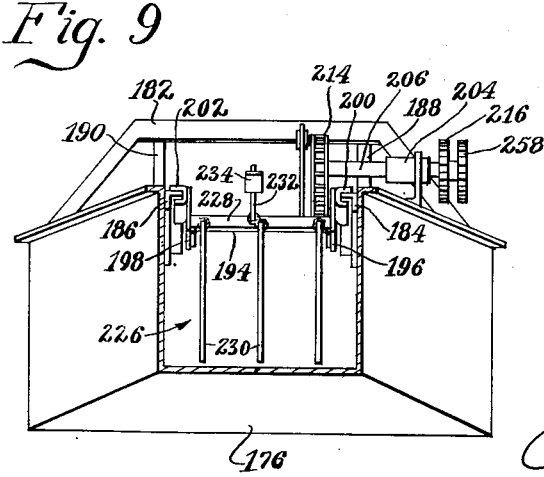
INVENTOR.
C. S. Morrison
Attorneys

UNITED STATES PATENT OFFICE 2,572,180

FEEDING MECHANISM FOR BALERS AND LIKE MACHINES

Charles S. Morrison, Moline, Ill., assignor to Deere & Company, Moline, Ill., a corporation of Illinois Application June 15, 1950, Serial No. 168,333

14 Claims. (Cl. 198—223)

This invention relates to feeding mechanism for crop-handling machines such as agricultural baling machines utilized for the purpose of picking up hay or straw and forming the same into bales.

A typical hay baler of the mobile type comprises a wheeled frame on which is mounted a bale case made up of a plurality of walls, one of which is vertical and has a feed opening therein through which material may be fed to the interior of the bale case by feeding means that receives hay or straw from pick-up means which in turn gathers the hay or straw from the ground as the machine advances over the field. In some pick-up balers, the bale case is elongated and extends in a direction parallel to the direction of travel of the machine. In other balers, the bale case is transverse to the direction of travel. In either case, there exists the problem of transferring the hay or straw from the feeding means to the interior of the bale chamber in such efficient manner and by intermittent charges so that the reciprocating plunger may readily compact the material into successive bales.

In balers of at least one known type, the feeding means utilized to effect the transfer of hay or straw or other crop material from the feed passage to the bale case comprises means in the form of conventional packer arms that move in an orbital path including entry of the packer arms into the bale chamber. Since these arms enter into the path of the reciprocating plunger, the arms and the plunger must be timed so that the plunger does not strike the arms. Because of the rapidity of the chronological events that occur in reciprocation of the plunger and operation of the feeder arms, it becomes necessary to retract the arms from the bale chamber as quickly as possible. For this purpose, the orbital path of the feeders is so designed that the feeder arms may be withdrawn from the bale chamber in a direction at an angle to their direction of entry. This requires slotting of another wall of the bale case to provide an exit for the arms. Since one wall of the bale case is already provided with a feed opening, the slotting of another wall materially weakens the bale case and additional or reenforcing structure is required.

In other types of balers, an auger or other continuous feed means is utilized. However, since an auger or equivalent means of this nature is fixed against shifting bodily in the direction of feeding, the delivery end thereof must necessarily terminate outside the bale chamber, with the result that delivery of the material to the bale chamber is not effected as far into the bale chamber as is desirable in most cases, resulting in faulty packing of the bale at portions of the bale case remote from the delivery end of the feeder. Such bales are apt to disintegrate during tying and handling.

The primary feature of the present invention resides in the provision of improved feeder means that eliminates the main disadvantages of either of the types noted above. In the accomplishment of this object, the improved feeder means utilizes a carrier that is reciprocable lengthwise of the feeder passage between a first position remote from the feed opening and a second position relatively close to but outside the feed opening. This carrier carries a feed element which is mounted on the carrier in such manner that when the carrier reaches its second position proximate to the feed opening, the feeder element may continue temporarily beyond this position so that portions of the feeder element enter the bale case and accomplish the desired delivery of material to remote portions of the bale case. The feeder element is preferably retractable by its own weight and the rapidity of the action of the feeder element in entering and departing from the bale case is such as to present no particular obstacle to continued reciprocation of the plunger.

Another object of the invention is to provide a feeder mechanism of the character outlined that may be readily attached to or built into balers of existing types. Still further objects of the invention are to provide: A feeder of the character mentioned including auxiliary feeder means; two forms of improved drive means for the feeder, including a rotating crankshaft or an endless belt or chain; the provision in that form of the invention including the crankshaft of means connected to certain of the crank throws for driving the feeder element and means connected to other of the crank throws for driving auxiliary feeders; and a simplified and economical construction designed to have high operating efficiency.

The foregoing and other important objects and desirable features inherent in and encompassed by the invention will become apparent as two preferred embodiments of the invention are disclosed, by way of example, in the following detailed description and accompanying sheets of drawings in which:

Figure 1 is a plan view of one form of the feeder mechanism, shown in association with a bale case;

Figure 2 is a transverse sectional view taken substantially on the line 2—2 of Figure 1;

Figure 3 is a longitudinal sectional view taken substantially on the line 3—3 of Figure 1 and showing the feeder in a retracted position;

Figure 4 is a longitudinal sectional view taken substantially on the line 4—4 of Figure 1 and showing the feeder in its delivery position;

Figure 5 is a transverse sectional view taken substantially on the line 5—5 of Figure 1;

Figure 6 is a perspective view in detail of the feeder element and carrier;

Figure 7 is a longitudinal sectional view showing a modified form of feeder, the feeder being shown in its retracted or remote position;

Figure 8 is a fragmentary sectional view similar to Figure 7 but showing the feeder element in its delivery position; and Figure 9 is a transverse sectional view taken substantially on the line 9—9 of Figure 7.

*In general*

In the disclosure of both forms of the invention, the baler chosen for the background illustration is of the type in which the bale case extends transverse to the line of travel of the mobile frame. However, this bale case is intended to represent merely one form of baler or equivalent crop-receiving means of the character to which the present invention may be applied. For the purposes of clarity in description, reference will be had to certain parts as extending in certain directions and having front and rear ends and right- and left-hand sides. However, it is not intended that this descriptive language in any way limit the scope of the invention, for it will be obvious that the parts may be otherwise arranged.

*Figures 1 through 6*

In this form of the invention a bale case 10 represents or is typical of one form of crop-receiving means with which may be used feeding mechanism constructed according to the principles of the invention. The bale case is made up of front and rear walls 12 and 14 and top and bottom walls 16 and 18 which define an elongated bale chamber of rectangular cross section (Figures 3 and 4). The front wall 12 is a vertical wall and is provided with a rectangular feed opening 20 (best shown in Figure 5). A plunger 22 (Figure 1) is carried in the bale case for reciprocation lengthwise of the bale chamber. This plunger has a pitman 24 that may be connected to any suitable drive mechanism (not shown) for effecting reciprocation of the plunger. Details in this respect have been omitted, since familiarity with various conventional constructions is assumed. A representative construction is shown in U. S. Patent 2,484,890.

As the plunger is reciprocated, it moves on a retracting stroke (upwardly as viewed in Figure 1) so that the front or leading face thereof clears the proximate edge of the feed opening 20. Material introduced through the feed opening into the bale chamber is encountered by the plunger on its compression stroke and is compacted in the form of successive charges into a bale, which is subsequently tied and ejected at the discharge end of the bale case (not shown), all as shown in representative fashion in the patent identified above.

For the purpose of supplying crop material such as hay or straw to the bale case 10 via the opening 20, the baler is provided with forwardly extending structure, designated generally by the numeral 26, defining a feed passage or throat extending generally normal to and outwardly from the front wall 12 in which the feed opening is formed. In the present case, the feed passage structure is in the form of a forwardly diverging trough having a forwardly and downwardly inclined bottom wall 28 and forwardly diverging side walls 30 and 32. In the case of a mobile pick-up baler, the forward or leading edge of the feeder structure will terminate and be disposed at a level above the ground line, as suggested in Figure 3. Since the hay or straw will be lying in windrows on the ground, pick-up means 34 may be provided for picking up the crop material and elevating it to the floor 28. The representative form of pick-up means illustrated here includes a drum 36 rotatable in the direction of the arrow A in Figure 3 and having crop-engaging fingers 38 for handling the crops. This pick-up may, if desired, be of the character shown in U. S. Patent 2,499,615. The details of the pick-up are unimportant and the representative form shown is illustrated here merely to serve as a source from which crops are fed over the feeder structure to the bale case 10.

The construction to the extent described is typical of a crop-handling machine of the mobile pick-up baler type. It will be seen that the principles involved in the illustrated construction are common to other types of crop-handling machines, such as combines, forage harvesters, etc.

A machine of this type, particularly as represented by a baler, will have some form of movable means for facilitating the transfer of crops from the pick-up means 34 to the bale case 10. Both the patents identified above show feeder mechanisms of this character. In Patent 2,484,890, the feeder means is of the type including packer fingers that move through the feed opening and are retractable through slots formed in the top wall of the bale case. According to the present invention, feed means is provided that will eliminate the disadvantages inherent in the design and operation of feeders of the type just referred to.

The instant form of improved feeding mechanism comprises supporting structure designated generally by the numeral 40 having means for the mounting thereof on the feeder structure 26. The supporting structure comprises essentially a transverse arch member 42 having opposite ends rigidly secured in any suitable fashion to the side walls 30 and 32 of the feeder structure 26. As best shown in Figure 1, this arch is located substantially intermediate the front and rear ends of the feeder structure. The supporting structure further includes track means extending longitudinally or lengthwise of the feeder structure, this track means comprising a pair of parallel, transversely spaced apart track members 44 and 46 having their forward ends projecting ahead of and below the arch 42 and rigidly carried by the arch through the medium of a pair of forwardly and downwardly inclined brace members 48 and 50. The rear ends of the track members 44 and 46 are cross connected by a transverse angle member 52 which may in turn or through the members 44 and 46 be rigidly connected to either the feeder structure 26 or bale case 10. The mounting of the supporting structure is relatively unimportant except to the extent that it provides means for mounting the feeder mechanism to be presently described. In a case in which the feeder mechanism is built into or becomes an integral part of the baler, the rear ends of the members 44 and 46 may be welded or otherwise rigidly attached to the bale case or feed structure and the legs of the arch 42 may be similarly mounted. Likewise, in those cases in which the feeder mechanism is utilized as an attachment to existing structures, welding or other suitable attaching methods may be employed, depending upon whether it is desired to mount the feeding mechanism permanently or temporarily. All this is, on the basis of what has been said above, within the ability of the skilled mechanic.

The track members 44 and 46 are above and generally parallel with the floor 28 of the feed structure 26. Each of these members, as best shown in Figures 4, 5 and 6, is in the form of a channel. This construction enables the track members to sustain a carrier indicated in its entirety by the numeral 54 and best shown in detail in Figure 6. This carrier preferably comprises a member 56 that is U-shaped in plan and that has opposite legs 58 and 60. The means for sustaining the carrier 54 on the track means 44—46 comprises a pair of rollers 62 and 64 connected respectively to brackets 66 and 68 which are in turn respectively rigidly fixed, as by welding, to the carrier legs 58 and 60. As shown in Figure 6, the arrangement of the brackets 66 and 68 is such that the carrier 54 is suspended by the rollers from the track means 44—46. Therefore, the carrier is capable of movement back and forth—or in a cycle of reciprocation—toward and away from the bale case 10. Specifically, the carrier is mounted for reciprocation between a first position B and a second position C. The position B is relatively remote from and outside the feed opening 20, as shown in Figures 1 and 3, and the position C, as shown in broken lines in Figure 3, is relatively close to and just outside the feed opening.

The means for driving the carrier 54 through its cycle of reciprocation so that it moves in a feeding direction D and in a retracting direction E (Figure 3) will now be described. In this form of the invention, the drive means includes a rotary member, here in the form of a crankshaft 70 having main bearings 72 and 74 at opposite ends journaled respectively in journal boxes 76 and 78 mounted respectively on the feeder structure side walls 30 and 32. The crankshaft further includes a pair of inner main bearings 80 and 82 journaled respectively in bearing boxes 84 and 86 fixed to the forward ends respectively of the track members 44 and 46.

The crankshaft 70 includes a central throw 88 to which is connected one end of a pitman 90. The other end of the pitman is rigidly connected at 92 to the U-shaped member 56 of the carrier 54. Thus, as the crankshaft 70 rotates, the pitman effects reciprocation of the carrier 54 in successive cycles between the positions B and C.

An important feature of the invention is the mounting on the carrier of a feeder element, designated generally by the numeral 94, which is best shown in Figure 6. This element preferably comprises a transverse pivot member or bar 96 having opposite ends pivoted or journaled respectively in the free ends of the carrier legs 58 and 60. The feeder element further includes a lower crop-engaging or feeding portion, here in the form of a plurality of depending fingers or tines 98. A block 100, rigidly secured to the leg 60 of the carrier 54 extends inwardly of that leg behind at least the proximate finger or tine 98, so as to engage the tine and thus hold the feeder element 94 against retrograde movement as respects the direction of feeding D. That is, as the carrier 54 moves from position B to position C, the feeder 94 moves with it from the full-line position of Figure 3 to the broken-line position of Figure 3, carrying crop material ahead of it for introduction through the feed opening 20 to the interior of the bale case or crop-receiving means 10.

The feeder element 94 further includes control means comprising in part an upper portion in the form of an upwardly extending lever arm 102 fixed, as respects the feeder fingers 98, preferably by being an integral extension of the central finger. This lever 102 projects above the pivot axis of the pivot rod or member 96 and includes a transversely extending stop or control pin 104.

The supporting structure 40 may be said to include as part thereof additional structure 106 mounted on the top wall 16 of the bale case 10. This structure includes stop or control means, designated generally by the numeral 108, cooperative with the stop or control means 102—104 on the feeder element 94 to effect movement of the feeder element fingers 98 beyond the position B, which result is accomplished in the manner to be presently described.

The supporting structure 106 includes a vertical member 110 braced at 112 to the bale case top wall 16 and having a forward extension 114 to which is pivoted at 116 a depending stop member 118. Yieldable means in the form of a coiled compression spring 120 is interposed between the stop member 118 and the vertical member 110 to cushion shock resulting from force applied to the member 118 at least in the feeding direction D. The lower portion of the stop member 118 is bifurcated or slotted at 122 (Figure 5) to accommodate the upper portion of the lever 102 and transverse stop pin 104. The spring 120 is retained by means such as a bolt 124.

From the description thus far, it will be seen that the carrier 54 is reciprocated between the positions B and C by the rotating crankshaft 70. The stop means comprising the member 118 is located substantially in the zone of the position C of the carrier. As the feeder 94 is carried in the feeding direction D by the carrier 54, the lever 102 will move toward the stop 118. The crankshaft 70 and pitman 90 serve as means to move the carrier 54 in the feeding direction D with considerable force. As the carrier 54 attains its position at B, the lever 102 and transverse pin 104 are accommodated by the bifurcated or slotted end 122 of the stop member 118 and as the carrier moves finally to its position C, the upper end or lever 102 of the feeder 94 is retarded or moved in a direction opposite to the feeding direction D, with the result that the lower or crop-engaging portions 98 of the feeder element will be thrown rapidly inwardly and upwardly in the direction of the arrow F as best exemplified in Figure 4. Hence, even though the carrier 54 stops outside the feed opening 20, the feeder element fingers 98 enter the bale chamber. The delivery effected by the fingers 98—as along the arrow F—is such as to impel the material to the upper right-hand or rearward corner of the bale case 10. In the past, bales formed by several well-known balers have been notably weak in this portion, due primarily to failure of known feeders to deliver the crop material properly and efficiently for compacting by the plunger. This is one of the main disadvantages eliminated by the present feeder. Since the greater mass of the feeder element 94 is below the pivot 96, the rapid movement of the feeder element in the direction F is temporary and the feeder element may return by its own weight to a position outside of the feed opening 20. Hence, the feeder element is quickly retracted from the bale case and therefore is not in danger of being encountered by the reciprocating plunger 22. Of course, the timing of the drive mechanism will be such that the feeder element 94 achieves its delivery position while the plunger 22 is on its retracting stroke. But, since this is a characteristic of known constructions—that is, to the extent that the feeder and plunger cannot occupy the same place at the same time—further elaboration on the timing of the drive means is deemed unnecessary here.

Another feature of the invention is the provision of auxiliary feed means as an adjunct or secondary to the feeder element 94. In this form of the invention, the crankshaft 70 includes a pair of additional throws 126 and 128. The supporting structure includes a pair of guide rods 130 and 132, each rigidly secured at its rear end to the transverse member 52 and each rigidly secured at its forward end to the transverse arch 42. These guide rods extend parallel to and lie just outside of the track members 44 and 46. The crank throw 126 has journaled thereto at 134 a feeder bar 136 that has its rear end fixed to an upstanding member 138 on which is provided a roller 140 that rides along the guide rod 130. The opposite throw 128 has journaled thereon at 142 the forward end of a similar feeder bar 144 that has its rear end provided with an upstanding member 146 provided at its upper end with a roller 148 that rides along the guide rod 132. The feeder bar 136 is provided at spaced intervals lengthwise thereof with fingers or raker teeth 150 and a plurality of similar raker teeth 152 are spaced along the other feeder bar 144. As a further adjunct to the feeding, the pitman 90 for the carrier 54 may have thereon a plurality of raker teeth or fingers 154. Figure 1 shows the transverse spacing and relationship of the feeder or raker teeth 150, 152 and 154; Figures 3 and 4 show the relationship of the raker teeth to the floor 28 of the feeder structure 26 and the further relationship of the endmost teeth to the pick-up 34, from which it will be seen that as the pick-up 34 delivers material to the floor 28, the raker teeth serve to advance the material along so that it is ultimately picked up by the feeder element 94 and delivered to the bale chamber as previously described.

The driving mechanism for the crankshaft 70 as illustrated in Figure 1 is merely representative of several forms that such driving mechanism could assume. An input shaft 156 is journaled on top of the bale case 10 and has a bevel pinion 158 in constant mesh with a bevel pinion 160, likewise journaled on top of the bale case 10. The pinion 160 is keyed to a short transverse shaft 162 at the outer end of which is fixed a drive sprocket 164. The right-hand end of the crankshaft 70 has keyed thereto a drive sprocket 166 in longitudinal alinement with the sprocket 164 and a drive chain 168 is trained about the two sprockets.

*Figures 7, 8 and 9*

In the disclosure of this embodiment of the invention, an entirely new set of reference characters will be utilized in the interests of brevity and clarity. At the same time, since many of the basic characteristics of this form of the invention and that previously described are quite similar, the present description will be somewhat brief. Any apparent omissions in the following description may be supplied from what has been said before.

In this form of the invention, a bale case 170 has a feed opening 172 provided in a vertical wall 174 thereof, through which opening crop material may be fed along a feed passage defined by feed structure 176 to the interior of the bale case. Pick-up means 178 very similar to the pick-up means 34 previously described is provided at the forward end of the feed structure 176 for picking up crop material from the ground and for delivering this material in the direction of the arrow G to the floor of the feed structure for subsequent movement in the feeding direction H to the bale case via the feed opening 172.

In this form of the invention, there is provided supporting structure designated generally by the numeral 180 and including a transverse arch 182 having opposite legs thereof respectively fixed to opposite side walls of the feed structure 176. The supporting means further includes a pair of longitudinally extending track members 184 and 186 (Figure 9) rigidly fixed at their rear ends to part of the feed structure 176 adjacent the feed opening 172 and carried at their forward ends by downwardly and forwardly depending brace members 188 and 190. In this respect, the supporting structure 180 is similar to that previously described.

The track members 184 and 186 provide means for mounting or sustaining a carrier 192 for movement lengthwise of the feed passage between a first position I and a second position J. The position I is represented in full lines in Figure 7 and the position J is indicated in broken lines in the same figure. The first position is relatively remote from the feed opening 172 and the second position is relatively proximate to but still just outside the feed opening. The carrier in this form of the invention comprises a transverse plate member 194 having opposite side portions 196 and 198 provided with longitudinal guides 200 and 202 respectively which ride the track members 184 and 186 respectively.

One side wall of the feed structure 176 has a bearing 204 (Figure 9) which journals a short transverse shaft 206. The inner end of this shaft has keyed thereto a rotatable element in the form of a chain sprocket 208. The bearing 204 could as well be supported by the supporting structure 180.

A forward portion of the supporting structure 180, just below the arch 182, carries a short transverse shaft 210 on which is keyed a rotatable element in the form of a chain sprocket 212. A driving chain or equivalent endless element 214 is trained about the sprocket and is driven in the direction of the arrow K (Figure 7). A second sprocket 216 may be keyed to the shaft 206 and a drive chain 218 may be trained about the sprocket 216 to provide input power for driving the chain 214. As will be apparent, the chain 218 may receive power from a sprocket such as that indicated at 164 in Figure 1.

The carrier 192 includes an upstanding member in the form of a plate 220 in which is formed a guide or slot 222 for cooperation with a follower or drive lug 224 carried by the carrier-drive chain 214. As the chain 214 moves in the direction of the arrow K, it carries the carrier from the position I to the position J and back again, the follower 224, as it moves about the sprockets 208 and 212, moving upwardly in the slot 222 but never departing from that slot.

The carrier has mounted thereon a feeder element, designated generally by the numeral 226. This feeder element may be substantially identical to the feeder element 94 described above. To this extent, it has a transverse pivot rod 228 and a plurality of depending portions in the form of crop-engaging fingers or tines 230. It further has an upstanding lever arm 232 provided with an abutment plate 234. The lever arm 232 and plate 234 provide part of control means for the feeder element 226, as will presently appear.

The pivot rod 228 suspends the feeder element 226 from the carrier 192 and a stop block 236 is provided on the carrier to prevent retrograde movement of the feeder element as respects the direction of feeding H. The feeder element 226 is thus sustained by and for movement with the carrier 192 between the positions I and J. In order that the feeder element may have the functioning of the feeder element 94 of the form of the invention previously described, the present form of the invention includes stop means designated generally by the numeral 238 and preferably comprises a spring-loaded plunger 240, the details of which are unimportant here. As the chain 214 drives the carrier 192 from the position I to the position J, the lever 232 approaches the plunger 240. As the carrier moves into its final position J, the lever 232 engages the plunger, thus stopping movement of the upper portion (lever 232) of the feeder element and causing the lower portions (fingers 230) to travel beyond the position K, as indicated in Figure 8, whereupon crop material is delivered rapidly into the bale case in the direction of the arrow L. As in the case of the previously described form of the invention, the introduction and rapid delivery of the feeder element into the bale chamber is temporary and the feeder element is immediately retracted by its own weight before it is engaged by the reciprocating plunger. In other words, all the essential characteristics of the feeder element 94 are present in the feeder element 226.

A further feature of the present form of the invention is the provision of feeding without the raker teeth such as those described at 150, 152 and 154. In this instance, the raker teeth are replaced by an auxiliary or secondary feeder designated generally by the numeral 242 and preferably comprising a rotatable shaft 244 having arms 246 (only one of which is shown) at opposite ends for supporting a pair of transverse tine bars 248, each of which carries a plurality of tines or crop-engaging fingers 250. The feeder 242 is located just above and to the rear of the pick-up 178 for the purpose of receiving crop material from the latter and for delivering such crop material in the direction of the arrow H so that it may be engaged by the feeder element 226 for ultimate delivery through the feed opening 172. The feeder 242 is of the type in which the tine bars 248 are controlled by a cam 252 so as to confine the tines to movement through a desired path, in the present case such as to be free from interference with the supporting structure 180. Feeder means of this type are not new. A representative form thereof is shown in U. S. Patent 2,499,615.

The shaft 244 of the feeder 242 may extend to one side and have keyed thereto a drive sprocket 254 about which is trained a drive chain 256. The driving shaft 206 may include another sprocket 258 (Figure 9) about which the chain 256 is trained so that the feeder 242 is driven in the direction of the arrow M in Figure 7.

Summary

The foregoing embodiments of the invention represent the various forms of mechanisms that may be utilized to accomplish the desired results on the basis of the principles outlined. In both forms of the invention, there is effected efficient and rapid delivery by means operative to travel through a feed opening for the purpose of delivering material into remote portions of a bale case or equivalent crop-handling or -receiving means. The crop delivery member or feeder element that enters the bale case is of relatively small mass and no special provision need be made in the bale case itself to accommodate the feeder element, as is the case in certain feeders of the type heretofore known. Inasmuch as the feeder element can travel in a feeding direction beyond the limitations imposed on the driving means, the feeding mechanism has considerable advantages over positive type feeders such as augers or the like that terminate outside the bale case wall or feed opening.

Various other features and advantages not specifically enumerated will undoubtedly occur to those versed in the art, as likewise will numerous modifications and alterations in the preferred forms of the invention illustrated, all of which may be achieved without departing from the spirit and scope of the invention as defined in the appended claims.

What is claimed is:

1. In a crop-handling machine having crop-receiving means including a wall provided with a feed opening and structure defining a feed passage extending outwardly from and generally normal to the wall and adjoining the opening and along which crop material may be fed through the feed opening and into the crop-handling means, the improvement residing in feeding mechanism comprising: supporting structure having means for the mounting thereof on the feed passage structure outside the wall; carrier means sustained by the supporting structure and arranged for movement lengthwise of the feed passage alternately toward and away from the feed opening between a first position remote from the feed opening and a second position proximate to and outside the feed opening; a feeder element having first and second end portions and pivot means intermediate said end portions; means including said pivot means mounting the feeder element on the carrier for movement with the carrier and so that the first end portion of the feeder element extends into the feed passage to engage crop material therein; and stop means fixedly positionable at the second position of the carrier and arranged to be engaged by the second end portion of the feeder element so that when the carrier reaches said second position engagement of the second end portion of the feeder element with the stop means causes the first end portion of the feeder element to travel beyond said second position of the carrier means for delivery of crop material through the feed opening.

2. The invention defined in claim 1, further characterized in that: the stop means is positionable just outwardly of the feed opening; and the lever arms provided by the feeder element end portions at opposite sides of said pivot means are of such length that the first end portion of the feeder element travels through the feed opening and into the crop-handling means.

3. The invention defined in claim 1, further characterized in that: the supporting structure includes a track running lengthwise of the feed passage; the carrier means includes bearing means riding the track; and drive means is carried by the supporting structure and connected to the carrier means for moving the carrier means between its first and second positions.

4. The invention defined in claim 1, further characterized in that: a crank is journaled on the supporting structure; and a pitman connects the crank and the carrier means for moving the carrier means between its first and second positions.

5. The invention defined in claim 1, further characterized in that: a pair of rotatable elements are journaled on the supporting structure and spaced lengthwise thereof generally on the order of the spacing between the first and second positions of the carrier; and an endless drive member is trained about the rotatable element and connected to the carrier means for moving the carrier means between its first and second positions.

6. The invention defined in claim 1, further characterized in that: a crankshaft having a plurality of throws is journaled on the supporting structure on an axis transverse to the feed passage; pitman means connects one of the crank throws and the carrier means for moving the carrier means between its first and second positions; and auxiliary feeders are connected to other throws of the crankshaft.

7. In a crop-handling machine having crop-receiving means including a wall provided with a feed opening and structure defining a feed passage extending outwardly from and generally normal to the wall and adjoining the opening and along which crop material may be fed through the feed opening and into the crop-handling means, the improvement residing in feeding mechanism comprising: supporting structure having means for the mounting thereof on the feed passage structure outside the wall; carrier means sustained by the supporting structure and arranged for movement lengthwise of the feed passage alternately toward and away from the feed opening between a first position remote from the feed opening and a second position proximate to and outside the feed opening; a feeder element positioned to extend into the feed passage for engaging crop material therein outside the feed opening; means connecting the feed element to the carrier for movement of the feed element by the carrier from said first position to said position, said connecting means including provision for movement of the feeder element temporarily beyond said second position; and means engageable with the feeder element and operative incident to attainment by the carrier means of said second position for effecting said movement of the feeder element beyond said second position.

8. In a baler or the like having a bale case including a vertical wall provided with a feed opening and structure defining a feed passage extending generally horizontally outwardly from and normal to the wall and adjoining the opening and along which crop material may be moved through the feed opening and into the bale case, the improvement residing in feed mechanism comprising: track means positionable to extend lengthwise of and over the feed passage; means for mounting the track means on the feed passage structure; a carrier reciprocable on the track means in alternate feeding and retracting directions between a first position relatively remote from the feed opening and a second position proximate to the feed opening and just outside the bale case wall; a feed element pivotally connected to and suspended from the carrier to depend into and engage crop material in the feed passage; one-way means engageable between the carrier and feed element to hold the feed element against retrograde movement as respects the direction of feeding but providing for swinging of the lower portion of the feed element in the direction of feeding; stop means fixedly positionable adjacent the bale case at a level above the pivotal connection of the feeder element to the carrier and generally in the zone of the second position of the carrier; means including a lever arm fixed to the feeder element and extending above said pivotal connection and engageable with the stop means incident to the attainment by the carrier of said second position for effecting swinging of the lower portion of the feed element beyond said second position; and means for reciprocating the carrier.

9. The invention defined in claim 8, further characterized in that: the reciprocating means comprises a rotatable crankshaft having a crank throw; and a pitman connecting the crank throw and the carrier.

10. The invention defined in claim 9, further characterized in that: the crankshaft has a crank throw in addition to the crank throw for the carrier; and auxiliary feeder means is connected to and driven by the additional crank throw.

11. The invention defined in claim 8, further characterized in that: the reciprocating means comprises a crankshaft having a crank throw centrally of the feed passage and a pair of additional crank throws, one at each side of the central crank throw; a pitman connects the central crank throw and the carrier; and auxiliary feeders are connected to and driven by the additional crank throws.

12. The invention defined in claim 8, further characterized in that: the reciprocating means comprises a pair of shafts transverse to the feed passage and spaced apart lengthwise thereof generally on the order of the spacing between the first and second positions of the carrier; rotating elements are carried respectively by the shafts; and an endless element is trained about the rotating elements and connected to the carrier.

13. The invention defined in claim 12, further characterized in that: the carrier includes an upwardly extending member provided with a vertical guide; and the connection between said endless element and the carrier includes said guide and a follower connected to said endless element.

14. The invention defined in claim 8, further characterized in that: the reciprocating means comprises a rotatable shaft transverse to the feed passage; means connecting the shaft and carrier for translating rotation of the shaft to reciprocation of the carrier; auxiliary feeder means in the feed passage; and drive means connecting the shaft to the auxiliary feeder means.

CHARLES S. MORRISON.

No references cited.